Nov. 17, 1931.   T. RITCHIE   1,832,243
FLOAT VALVE CONSTRUCTION
Filed May 27, 1929
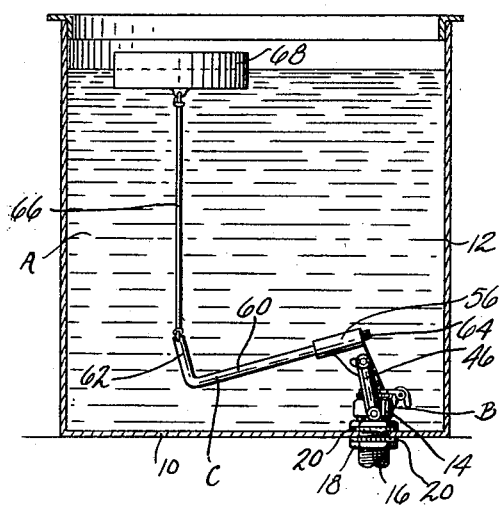
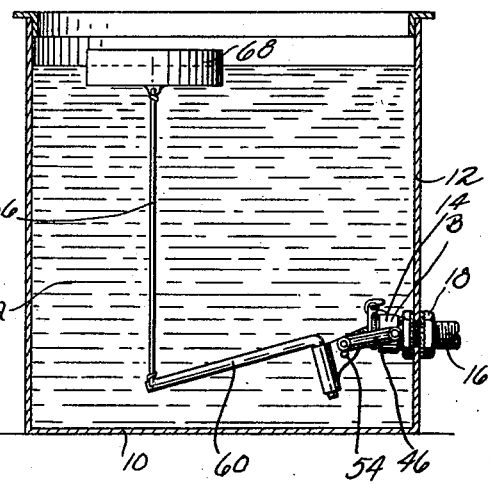
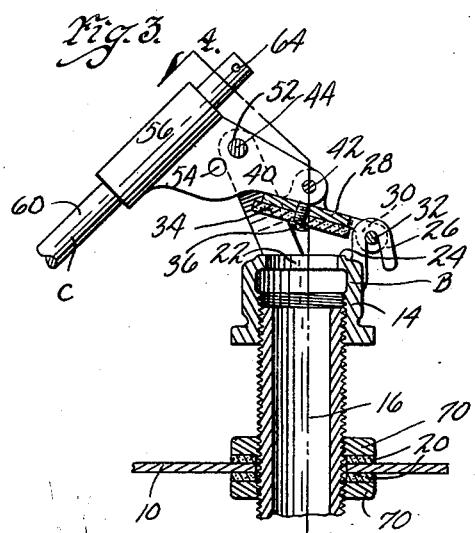
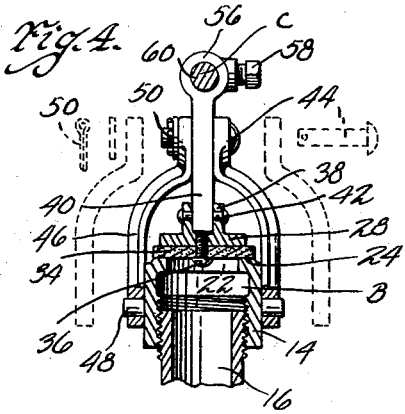
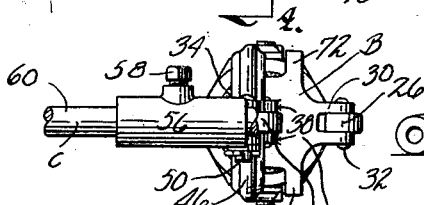
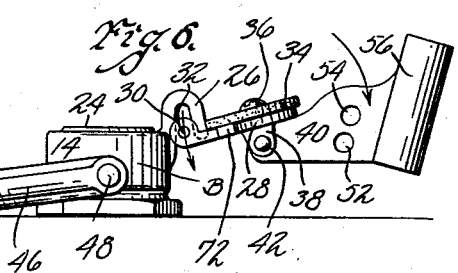
Inventor
Thomas Ritchie
By Bair, Freeman & Sinclair
Attorneys Patented Nov. 17, 1931

1,832,243

UNITED STATES PATENT OFFICE

THOMAS RITCHIE, OF MARSHALLTOWN, IOWA, ASSIGNOR TO RITCHIE MANUFACTURING COMPANY, OF MARSHALLTOWN, IOWA, A CORPORATION OF IOWA

FLOAT VALVE CONSTRUCTION

Application filed May 27, 1929. Serial No. 366,349.

The object of my invention is to provide a float valve construction adapted for use in tanks, such as watering tanks, the parts of the construction being simple, durable and inexpensive to manufacture.

A further object is to provide a float valve construction having a float arm of such character that the float valve may be mounted in the bottom of a tank or the side thereof.

Still a further object is to provide a float valve construction which may be disassembled for the renewal of parts or for any other purpose by merely removing a single cotter key without the necessity of removing the float valve from the supply pipe to which it is attached.

More particularly it is my object to provide a float valve consisting of a body portion having a valve seat and a hook member formed thereon, a valve plate adapted to coact with the seat and having a pivot pin received in said hook member and a float arm consisting of an arm member and a lever member, the lever member being pivoted to the valve plate and pivotally supported on yoke arms which are in turn pivoted to studs on the valve body.

Still a further object is to provide a float arm member of L shaped construction with one of its legs considerably longer than the other, whereby such arm member adapts the valve for being secured at either the bottom or side of a watering tank.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved float construction illustrating it associated with a water tank, the tank being shown in section and the float valve being connected with the bottom of the tank.

Figure 2 is a modification with the valve fastened in the side wall of a tank.

Figure 3 is an enlarged sectional view through the float showing it in a raised position above the bottom of the tank.

Figure 4 is a sectional view on the line 4—4 of Figure 3 and showing in dotted lines parts of the valve disassembled.

Figure 5 is a plan view of the float valve construction; and

Figure 6 is a side elevation illustrating the device partly disassembled.

On the accompanying drawings I have used the reference character A to indicate generally a watering tank. The bottom of the tank is indicated at 10, while the side wall thereof is indicated at 12. My float valve construction is indicated generally by the reference character B and consists of a body portion 14 internally screw threaded.

A water supply pipe 16 extends through the bottom of the tank A (see Figure 1) and is positioned relative therethrough by means of the body portion 14 and a lock nut 18. Packing gaskets 20 are provided on each side of the bottom 10.

In Figure 2 I have illustrated the supply pipe 16 as extending through the side wall 12 of the tank A but otherwise secured therethrough in the same manner as the valve illustrated in Figure 1. The valve body 14 is provided with a discharge opening 22 surrounded by a valve seat 24. A hook member 26 is formed on the valve body 14 and opens in a direction toward the pipe 16. A valve plate 28 is adapted to coact with the valve seat 24 and is provided with a pair of ears 30 straddling the hook 26. A pivot pin 32 extends through the ears 30 and through the slot in the hook member 26 whereby the valve plate 28 is pivotally mounted relative to the valve body 14. The valve plate 28 is preferably pivoted on the surface adjacent the valve seat 24 with a washer 34 of leather or the like. The washer 34 is held in position by a screw 36 threaded into the valve plate 28 and easily removed therefrom.

A pair of ears 38 are formed on the upper surface of the valve plate 28 and a lever member 40 has one end pivoted between these ears by means of a pivot pin 42. The lever member 40 is also pivoted by means of a pivot pin 44 with a pair of yoke arms 46. The lower ends of the yoke arms 46 are pivoted on trunnions 48 projecting from the valve body 14. A removable cotter pin 50 is provided in the pivot pin 44. The lever member 40 is provided with openings 52 and 54 for the pivot 44 whereby the device may be adjusted for high or low pressure. (The drawing showing the pin 44 in the lower pressure opening 52.)

A hub 56 is formed on the lever member 40 and is provided with a set screw 58. A float arm C consisting of a round rod having arms 60 and 62 extends into the hub 56 and is retained therein by the set screw 58. In Figure 1 the arm 60 extends into the hub 56 while in Figure 2 the arm 62 extends into the hub. Each end of the float arm C is provided with a small opening 64 in which a wire 66 may be connected, the upper end of the wire being connected with a float member 68.

In the installation shown in Figure 3 the valve body 14 is spaced above the bottom 10 of the tank and a pair of lock nuts 70 are provided for the pipe 16. In this position it is possible for the float valve to be fully opened so that the pivot pin 32 engages the top of the slot in the hook 26 for opening the valve wide and allowing a free flow of water therefrom, sufficient to clean any straw or other obstacle from the valve seat. When the valve is closed the pin 32 floats in the slot of the hook 26 thereby allowing the valve plate washer 34 to be evenly seated on the valve seat 24.

The valve plate 28 is provided with a pair of stop arms 72 to engage the yoke arms 46 to prevent them from passing over center. When such engagement occurs it indicates that it is necessary to back up the washer 34 slightly with a sheet of paper or the like so that the valve can close tightly before the yoke arms engage the stops 72. It will be noted that the yoke arms are almost on center when the valve is closed as shown in Figures 1 and 2 so that the greatest leverage of movement is had at the closed position of the valve. Thus high pressures even with large valve openings 22 may be controlled by my valve construction.

One of the particular advantages is in the disassembling of the device without removing it from the supply pipe 16. As shown in dotted lines in Figure 4 the cotter pin 50 may be removed after which the pivot pin 44 may be withdrawn and the yoke arms 46 removed from the trunnions 48. The valve plate 28 and the lever member 40 may then be swung to the position illustrated in Figure 6 and the valve plate entirely removed from the valve body 14. This considerably facilitates repair and the removal of parts of my device.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a float valve construction, a valve body having a seat at one end and adapted to have its other end mounted on a water supply pipe, a pivoted valve plate adapted to coact with said valve seat, yoke arms pivoted to said valve body, a float arm pivoted to said valve plate and to said yoke arms, said float arm including a lever member having a sleeve and an arm member, said arm member being substantially L shaped and having one of its legs longer than the other one, either of said legs being adapted to be received in the sleeve of said lever member and means for securing such leg therein.

2. In a float valve construction, a valve body having a seat at one end and adapted to have its other end mounted on a water supply pipe, a hook on said valve body, said hook opening toward said other end, a valve plate having a pivot pin mounted in the slot of said hook and adapted to coact with said valve seat, a float lever connected with said valve plate, said float arm including a lever member and an arm member, said arm member being substantially L shaped and having one of its legs longer than the other one, either of said legs being adapted to be received and secured in said sleeve.

Des Moines, Iowa, May 9, 1929.

THOMAS RITCHIE.